(12) United States Patent
Bramson et al.

(10) Patent No.: US 10,024,275 B2
(45) Date of Patent: Jul. 17, 2018

(54) CONDENSATE MANAGEMENT SYSTEM FOR AN EXHAUST GAS COOLER AND HEAT RECOVERY DEVICE

(71) Applicant: Ford Global Technologies, LLC, Dearborn, MI (US)

(72) Inventors: Eric David Bramson, Ann Arbor, MI (US); Steven Michael Cyr, Lake Orion, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 67 days.

(21) Appl. No.: 14/993,497

(22) Filed: Jan. 12, 2016

(65) Prior Publication Data

US 2017/0198664 A1   Jul. 13, 2017

(51) Int. Cl.

| F02M 26/30 | (2016.01) |
| F02M 26/29 | (2016.01) |
| F02M 26/05 | (2016.01) |
| F02M 26/16 | (2016.01) |
| F02M 26/23 | (2016.01) |
| F02D 41/00 | (2006.01) |

(Continued)

(52) U.S. Cl.
CPC ........... *F02M 26/30* (2016.02); *F02D 41/005* (2013.01); *F02D 41/0065* (2013.01); *F02D 41/0072* (2013.01); *F02D 41/0077* (2013.01); *F02D 41/064* (2013.01); *F02M 26/05* (2016.02); *F02M 26/16* (2016.02); *F02M 26/23* (2016.02); *F02M 26/29* (2016.02); *F02M 26/35* (2016.02); *Y02T 10/47* (2013.01)

(58) Field of Classification Search
CPC ........ F02M 26/22–26/32; F02M 26/35; F02M 26/16; F02D 41/006; F02D 41/0077; F02D 41/064; F02D 41/005

USPC ................ 123/568.12, 563, 568.17–568.19; 60/605.1, 605.2, 320; 701/108
See application file for complete search history.

(56) References Cited

U.S. PATENT DOCUMENTS 6,126,151 A   10/2000 Vodicka
6,301,888 B1 * 10/2001 Gray, Jr. ............ B01D 53/9495
                                                         123/568.11

(Continued)

FOREIGN PATENT DOCUMENTS

CN   103883433 A   6/2014
CN   203742842 U   7/2014

(Continued)

OTHER PUBLICATIONS

Ramson, Eric David, "Exhaust System and Methods for Efficient Exhaust Heat Recovery," U.S. Appl. No. 14/521,413, filed Oct. 22, 2014, 44 pages.

*Primary Examiner* — Lindsay Low
*Assistant Examiner* — Robert Werner
(74) *Attorney, Agent, or Firm* — Julia Voutyras; McCoy Russell LLP

(57) ABSTRACT

Methods and systems are provided for condensate management in an EGR cooler of an engine system. In one example, an exhaust gas recirculation (EGR) system with an EGR cooler is coupled to an exhaust system and to an intake system of an engine. The EGR cooler includes an inlet coupled to the exhaust system, a first outlet coupled to the exhaust system, and a second outlet coupled to the intake system, the second outlet positioned vertically higher than the first outlet.

19 Claims, 3 Drawing Sheets

(51) Int. Cl.
*F02D 41/06* (2006.01)
*F02M 26/35* (2016.01)

(56) References Cited

U.S. PATENT DOCUMENTS

| | | | | |
|---|---|---|---|---|
| 6,971,377 | B2 * | 12/2005 | Moyer | F02M 26/25 |
| | | | | 123/568.12 |
| 7,469,691 | B2 * | 12/2008 | Joergl | F02M 26/47 |
| | | | | 123/568.12 |
| 8,015,809 | B2 * | 9/2011 | Watson | F01N 3/005 |
| | | | | 123/25 A |
| 8,418,461 | B2 * | 4/2013 | Siuchta | F02M 26/30 |
| | | | | 60/605.1 |
| 9,599,068 | B2 * | 3/2017 | Nishida | F01L 1/34 |
| 2006/0130818 | A1 * | 6/2006 | Igami | F28D 1/047 |
| | | | | 123/568.12 |
| 2007/0261400 | A1 | 11/2007 | Digele et al. | |
| 2008/0223345 | A1 * | 9/2008 | Hummel | F02B 29/0462 |
| | | | | 123/542 |
| 2012/0174576 | A1 * | 7/2012 | Vigild | F02B 29/0468 |
| | | | | 60/599 |
| 2013/0019847 | A1 | 1/2013 | Nelson et al. | |
| 2014/0102428 | A1 * | 4/2014 | Fulton | F02B 29/0468 |
| | | | | 123/568.12 |
| 2014/0190148 | A1 * | 7/2014 | Ruhland | F02M 25/0735 |
| | | | | 60/274 |
| 2016/0138451 | A1 * | 5/2016 | Takada | F01N 3/2066 |
| | | | | 60/278 |

FOREIGN PATENT DOCUMENTS

| | | |
|---|---|---|
| DE | 102010007092 A1 | 8/2011 |
| EP | 0905357 B1 | 11/2003 |

* cited by examiner

CONDENSATE MANAGEMENT SYSTEM FOR AN EXHAUST GAS COOLER AND HEAT RECOVERY DEVICE

FIELD

The present description relates generally to systems for condensate management in exhaust gas recirculation and exhaust gas heat recovery system.

BACKGROUND/SUMMARY

Exhaust gas recirculation (EGR) systems are used in internal combustion engines to reduce emissions and increase combustion efficiency. The exhaust gas flowing through the EGR system may flow through a heat exchanger, such as an EGR cooler. The EGR cooler may function to reduce the exhaust gas temperature before entering the intake manifold, thereby increasing density of the air entering the engine and thus increasing engine power and improving fuel efficiency. Further, cooled air may lower combustion temperatures and aid in controlling certain engine emissions. However, under certain conditions, such as during engine cold start, condensate may form within the EGR cooler. The condensate may accumulate in the EGR cooler and may then be swept to the engine. A small volume of condensate may not effect engine functioning, while a larger volume of condensate may cause engine misfire and may reduce the effectiveness of the EGR cooler over time. Further, in EGR coolers, which cool exhaust being recirculated back to the intake, acidic compounds may be present in the condensate, resulting in degradation to the cooler and/or downstream components.

To prevent the accumulation of condensate within the heat exchanger, a bypass line may be provided around the heat exchanger. During conditions in which condensate is predicted to form in the heat exchanger, the air normally provided to the heat exchanger may be routed through the bypass line to avoid possible deposition of condensate within the heat exchanger. However, such bypass lines may be expensive and increase the complexity of the engine control system strategy. Further, it may be difficult to accurately predict when condensation may form, resulting in unnecessary bypass of the air and increased temperature and decreased density of the air.

The inventors have recognized the issues with the above approach and offer a system to at least partly mitigate the problem of excess condensate generation in EGR coolers. One embodiment for a system includes an engine coupled to an intake system and an exhaust system, an exhaust gas recirculation (EGR) system coupling the exhaust system to the intake system, and an EGR cooler positioned in the EGR system, the EGR cooler having an inlet coupled to the exhaust system, a first outlet coupled to the exhaust system, and a second outlet coupled to the intake system, the second outlet positioned vertically higher than the first outlet.

In this way, the condensate accumulated in an EGR cooler may be directed through the first outlet towards the exhaust system, thereby preventing the condensate from exiting through the EGR cooler second outlet, which connects to the intake manifold of the engine and is vertically higher than the first outlet. Flowing the condensate from the EGR cooler towards the exhaust system and preventing the condensate from entering the engine may reduce engine combustion problems, including engine misfire.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
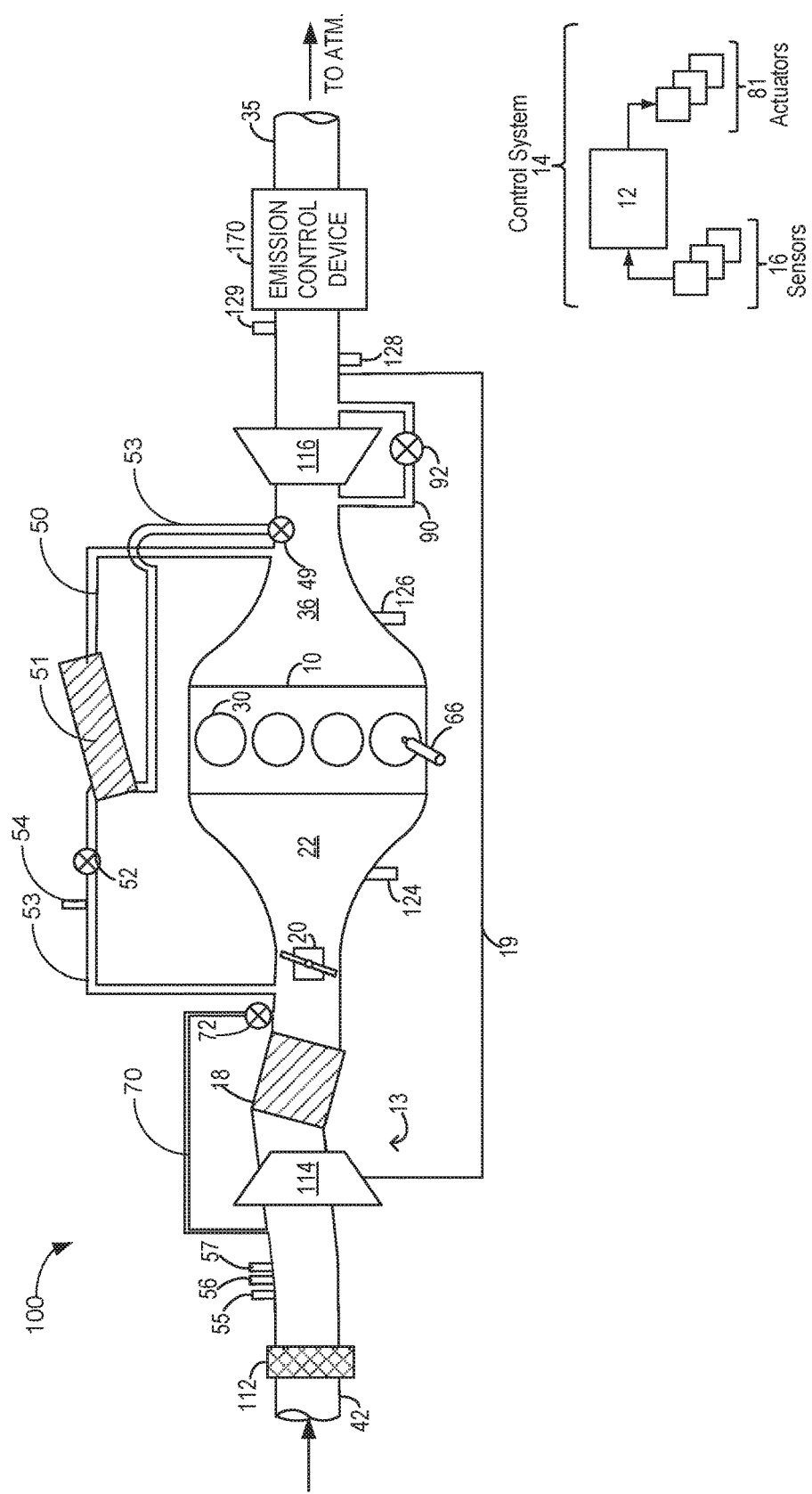
FIG. 1 schematically depicts an example engine including a charge-air cooler and an exhaust gas recirculation (EGR) system with an EGR cooler.
Figure 2:
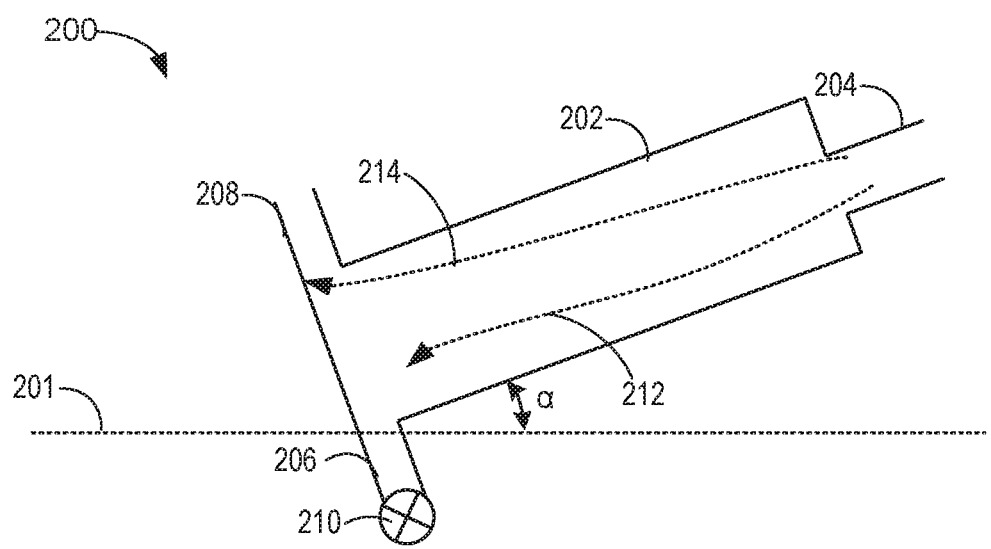
FIG. 2 shows a schematic of an inclined EGR cooler with an inlet and two outlets.
Figure 3:
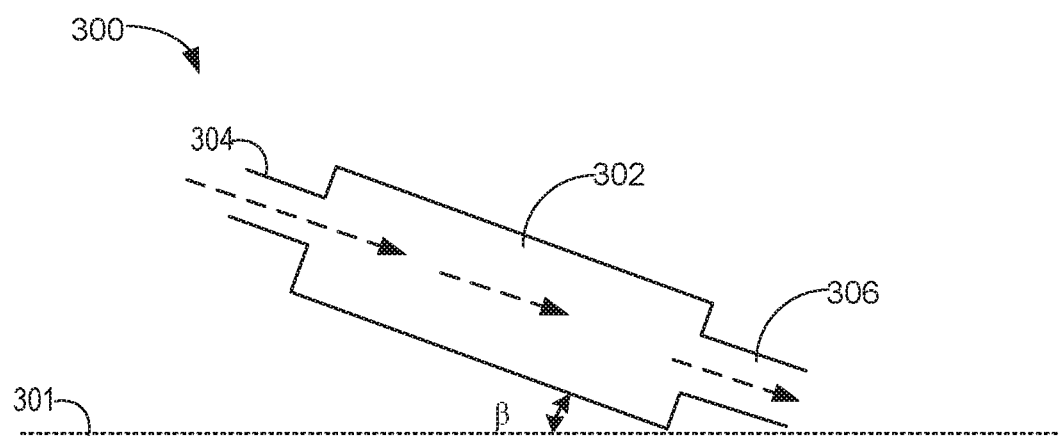
FIG. 3 shows an inclined charged air cooler with an inlet and an outlet.
Figure 4:
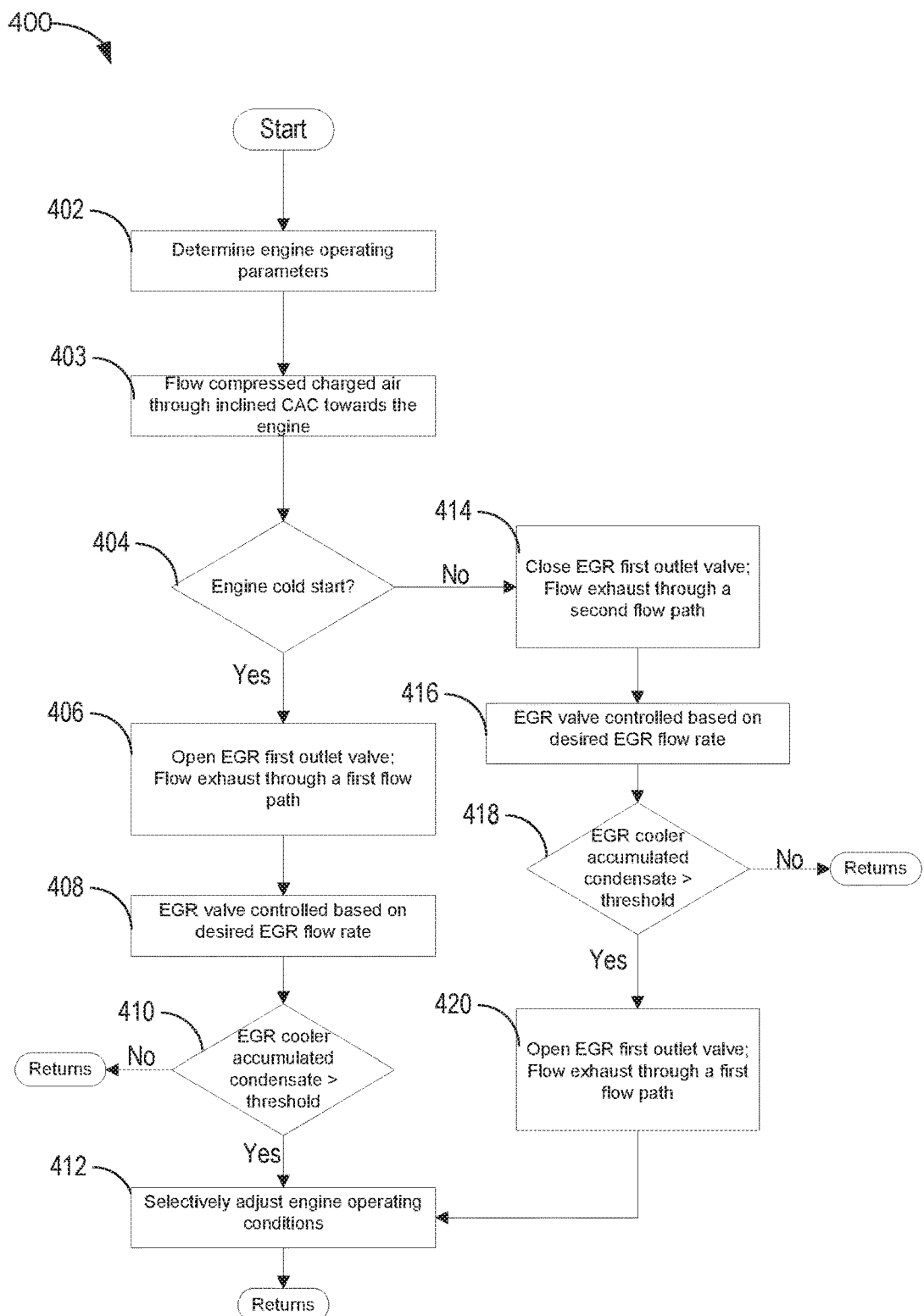
FIG. 4 shows a method for regulating condensate flow through an inclined EGR cooler with two outlets.

Engine heat exchangers, such as EGR coolers and charge air coolers (CACs), may accumulate condensate under some conditions. The accumulated condensate may be swept to the engine, where if it is present in large amounts, may cause engine misfire and other combustion issues or component damage. In order to prevent the accumulation of condensate within an engine heat exchanger, the heat exchangers may be arranged with a slope, such that the condensate flow may be directed along the slope to exit the heat exchanger, without damaging the engine and other associated components. FIG. 1 illustrates an engine system with an inclined EGR cooler and an inclined CAC. FIG. 2 and FIG. 3 show schematics of an inclined EGR cooler and an inclined CAC respectively. FIG. 4 shows a method for regulating condensate flow through an inclined EGR cooler connected to an engine.

FIG. 1 schematically shows aspects of an example engine system 100 including an engine 10. In the depicted embodiment, engine 10 is a boosted engine coupled to a turbocharger 13 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, however, the compressor is a turbocharger compressor mechanically coupled to turbine 116 via a shaft 19, the turbine 116 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed.

Since flow through the compressor can heat the compressed air, a downstream charge-air cooler (CAC) 18 is provided so that boosted intake charged air can be cooled prior to delivery to the engine intake. As shown in FIG. 1, compressor 114 is coupled, through CAC 18 (herein also referred to as an intercooler) to throttle valve 20. Throttle valve 20 is coupled to engine intake manifold 22. From the compressor, the compressed charged airflows through the charge-air cooler 18 and the throttle valve to the intake manifold. The charge-air cooler may be an air-to-air heat exchanger. In the embodiment shown in FIG. 1, the pressure of the air charge within the intake manifold is sensed by manifold air pressure (MAP) sensor 124.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, a humidity sensor 57 may be coupled to the inlet for estimating a humidity of air charge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when EGR is enabled, the sensors may estimate a temperature, pressure, humidity, and air-fuel ratio of the air charge mixture including fresh air, recirculated compressed air, and exhaust residuals received at the compressor inlet.

During selected conditions, such as during a tip-out, when going from engine operation with boost to engine operation without boost, compressor surge can occur. This is due to an increased pressure differential being generated across the compressor when the throttle closes at the tip-out. The increased pressure differential reduces forward flow through the compressor, causing surge and degraded turbocharger performance. In addition, surge can lead to NV issues such as undesirable noise from the engine intake system. To relieve boost pressure and reduce compressor surge, at least a portion of the air charge compressed by compressor 114 may be recirculated to the compressor inlet. This allows excess boost pressure to be substantially immediately relieved. The compressor recirculation system may include a compressor recirculation passage 70 with a recirculation valve 72 for recirculating cooled compressed air from the compressor outlet, downstream of charge-air cooler 18 to the compressor inlet. In some embodiments, an additional compressor recirculation passage (not shown) may be provided for recirculating un-cooled (or warm) compressed air from the compressor outlet, upstream of charge-air cooler 18 to the compressor inlet.

Surge may also be relieved by reducing exhaust pressure at turbine 116. For example, a wastegate actuator 92 may be actuated open to redirect at least some exhaust pressure from upstream of the turbine to a location downstream of the turbine via wastegate 90. By reducing exhaust pressure upstream of the turbine, turbine speed can be reduced, which in turn helps to reduce compressor surge. However, due to the boost dynamics of the wastegate, the effects of compressor recirculation valve adjustments on reducing surge may be faster than the effects of the wastegate adjustments.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections is directed to turbine 116 to drive the turbine. When reduced turbine torque is desired, some exhaust may be directed instead through wastegate 90, bypassing the turbine. The combined flow from the turbine and the wastegate then flows through emission control 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$, or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

All or part of the treated exhaust from emission control 170 may be released into the atmosphere via exhaust conduit 35. Depending on operating conditions, however, a portion of the exhaust residuals may be diverted instead to EGR passage 50, through an EGR cooler 51 and EGR valve 52, to the intake manifold 22. As such, EGR passage 50 couples the engine exhaust manifold, upstream of the turbine 116, with the engine intake manifold, downstream of the compressor 114.

EGR valve 52 may be opened to admit a controlled amount of cooled exhaust gas through the EGR passage 50, connecting downstream of the compressor for desirable combustion and emissions-control performance. In this way, engine system 10 is adapted to provide external, high pressure (HP) EGR by tapping exhaust gas from upstream of turbine 116. EGR valve 52 may also be configured as a continuously variable valve. In an alternate example, however, EGR valve 52 may be configured as an on/off valve. The rotation of the compressor, in addition to the relatively long HP-EGR flow path in engine system 10, provides homogenization of the exhaust gas into the intake air charge. Further, the disposition of EGR take-off and mixing points provides effective cooling of the exhaust gas for increased available EGR mass and better performance.

In one example, the engine system may additionally or alternatively include a low pressure (LP) EGR flow path wherein exhaust gas is drawn from downstream of turbine 116 and recirculated to the engine intake manifold, upstream of the compressor 114. EGR valves may regulate the flow of exhaust through the LP-EGR. In one example, the LP-EGR may include an EGR cooler, for cooling the exhaust gas being recirculated back to the engine. In another example, both HP-EGR and LP-EGR may be present in the system 100 to recirculate exhaust gas to the engine.

The EGR cooler 51 may be coupled to EGR passage 50 for cooling EGR delivered to the engine intake. In addition, one or more sensors 54 may be coupled to EGR passage 50 for providing details regarding the composition and condition of the EGR. For example, a temperature sensor may be provided for determining a temperature of the EGR, a pressure sensor may be provided for determining a pressure of the EGR, a humidity sensor may be provided for determining a humidity or water content of the EGR, and/or an air-fuel ratio sensor may be provided for estimating an air-fuel ratio of the EGR. An opening of the EGR valve may be adjusted based on the engine operating conditions and the EGR conditions to provide a desired amount of engine dilution.

The EGR cooler 51 may be liquid-to-air heat exchanger that flows engine coolant in heat exchange relationship with the exhaust gas flowing through the EGR cooler. The EGR cooler may include flow conduits/tubes routing the exhaust gas from the EGR passage 50 and the engine coolant in heat exchange relationship, without mixing of the two fluids. The coolant may extract heat from the hot exhaust gas and flow to the engine cooling system the engine, radiator, or other cooling system component) to cool the engine, and the cooled exhaust gas may be re-circulated to the intake manifold of the engine. Reducing engine combustion temperature helps prevent the formation of nitrogen oxides (NOx) pollutants. In addition, the EGR cooler reduces thermal stress on cylinder head gaskets and intake/exhaust valves, which can contribute to component life. When the temperature of the engine coolant is much lower than the exhaust gas, for example during cold start conditions, the low coolant temperature may lead to a large reduction in exhaust gas temperature (below dew point) flowing through the EGR cooler, generating condensate, which may accumulate in the EGR cooler.

The EGR cooler 51 may function as a combination device for exhaust gas heat recovery and exhaust gas recirculation to the engine. The exhaust gas flowing through the EGR cooler may transfer heat to an engine coolant, and at least a portion of the exhaust gas may flow back to the exhaust system, for example, during cold start when the engine is below a threshold temperature, thus enabling quick engine warm up while exhaust gas recirculation to the engine intake may not be enabled due to combustion stability issues during cold start conditions, for example. During cold start conditions, the temperature difference between the engine coolant and the exhaust gas flowing through the EGR cooler may result in condensate generation in the EGR cooler.

The EGR cooler may also recirculate the cooled exhaust gas to the engine when needed. The flow of the exhaust gas from the EGR cooler to the exhaust system or towards the engine intake may depend on engine operating parameters, including engine temperature, engine speed, engine load etc. The EGR cooler 51 may include two outlets, one for exhaust gas recovery mode, flowing the exhaust gas after heat recovery back to the exhaust system, and another outlet for exhaust gas recirculation to the engine intake. The EGR flow to the engine intake from the EGR cooler may be regulated by the EGR valve 52 and flow of exhaust gas from the EGR cooler to the exhaust system may be regulated by an EGR cooler first outlet valve 49.

To manage the condensate generated in the EGR cooler 51, in one example, the EGR cooler may be at a slope such that an EGR cooler first outlet is vertically lower than an EGR cooler second outlet and vertically lower than an inlet of the EGR cooler. In one example, the EGR cooler 51 may include an exhaust gas inlet connecting to EGR passage 50, bringing in hot exhaust gas to the EGR cooler and two EGR outlets, a first outlet connecting to the EGR line 53, flowing the cooled exhaust gas back to the exhaust manifold 36 and a second EGR outlet connecting to the EGR line 53, connecting to the intake manifold 22. The EGR cooler first outlet valve 49 may regulate the flow of EGR through the first outlet to the exhaust system. In some examples, condensate generated in the EGR cooler, for example during cold start conditions, may be prevented from exiting through the second outlet by flowing the condensate along the slope of the EGR cooler, along gravity through the first outlet connecting back to the exhaust manifold. The EGR cooler will be described in detail below with reference to FIG. 2.

During cold CAC conditions, such as during an engine cold start or during conditions of high ambient humidity, condensation may accumulate in the CAC that may be directed to the engine, leading to engine misfire events and NVH issues. In one example, to drain the small volume of condensate from the CAC, the CAC outlet may be lower than the CAC inlet, inclining the CAC towards the engine and enabling flow of condensate from the CAC to the engine. Preventing condensate accumulation in the CAC may prevent a large volume of condensate from being swept into the engine, which may result in combustion problems, including engine misfire. The inclined CAC will be discussed in further details with reference to FIG. 3.

Engine system 100 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, MAP sensor 124, exhaust temperature sensor 128, exhaust pressure sensor 129, compressor inlet temperature sensor 55, compressor inlet pressure sensor 56, compressor inlet humidity sensor 57, and EGR sensor 54. Other sensors such as additional pressure, temperature, air/fuel ratio, and composition sensors may be coupled to various locations in engine system 100. The actuators 81 may include, for example, throttle 20, EGR valve 52, EGR cooler first outlet valve 49, wastegate 92, and fuel injector 66. The control system 14 may include a controller 12. The controller may receive input data from the various sensors, process the input data, and trigger various actuators in response to the processed input data based on instruction or code programmed therein corresponding to one or more routines.

FIG. 2 shows a schematic 200 of an EGR cooler 202. EGR cooler 202 is one non-limiting example of EGR cooler 51 of FIG. 1. EGR cooler 202 includes an inlet 204 flowing in exhaust gas to the EGR cooler 202 and two EGR cooler outlets, an EGR cooler first outlet 206 and an EGR cooler second outlet 208. The inlet 204 may connect to an exhaust line flowing in exhaust gas into the EGR cooler from the exhaust system. The EGR cooler first outlet 206 may connect to an exhaust system (e.g., at an exhaust manifold) of an engine, flowing back exhaust gas and condensate from the EGR cooler to the exhaust system, and the EGR cooler second outlet 208 may fluidically connect to an intake system (e.g., the second outlet may couple to an intake manifold) of an engine, directing exhaust gas flow from the EGR cooler 202 to the engine intake. An EGR cooler first outlet valve 210 may regulate the flow through the EGR cooler first outlet 206. In one example, the EGR cooler 202 may be the EGR cooler 51 of FIG. 1, the inlet 204 connecting to EGR passage 50, the EGR cooler first outlet 206 connecting through EGR line 53 to the exhaust manifold 36, and the EGR cooler second outlet connecting to the engine intake 22.

The EGR cooler 202 may be a liquid-to-air heat exchanger with exhaust gas flowing in heat exchange relationship with an engine coolant. Condensate may generate in the EGR cooler in certain conditions, such as when the air EGR cooler is cooled below its dew point (or when the surfaces of the EGR cooler are below the dew point of the exhaust) by a cold engine coolant, resulting in condensation, which may accumulate in the EGR cooler. If allowed to accumulate, the condensate in the EGR cooler may be swept to the engine, which may result in engine misfire.

To prevent accumulation of condensate in the EGR cooler 202, the EGR cooler may be positioned at an incline, such that EGR cooler 202 is at an angle α relative to a horizontal axis 201, as illustrated in FIG. 2. The angle α may range from 5°-90°. The inclined EGR cooler may have a downward slope in an exhaust gas flow direction, e.g., inclined downward from the EGR cooler inlet to the EGR cooler outlets. The incline of the EGR cooler 202 results in positioning of the EGR cooler inlet 204 geodetically higher than the EGR cooler first outlet 206. Additionally, the EGR cooler second outlet 208 may be geodetically higher than the EGR cooler first outlet 206. In one example, the EGR cooler inlet 204 is vertically higher than the EGR cooler first outlet 206 with respect to a ground on which a vehicle that the EGR cooler is installed sits. While the EGR cooler is depicted in FIG. 2 as having a continuous, straight, vertically downward slope, any curvature of the EGR cooler that maintains a continuous downhill (sump-free) slope from the inlet to first outlet may be used.

In the example illustrated in FIG. 2, the EGR cooler second outlet 208 is geodetically lower (e.g., vertically lower with respect to the ground) than the inlet 204 and higher than the EGR cooler first outlet 206. In other examples, the EGR cooler second outlet 208 may be at the same vertical plane as the inlet 204 or may be geodetically higher than the inlet 204, depending on the position of the inlet 204 and the EGR cooler second outlet 208 on the EGR cooler 202. The EGR cooler first outlet 206 may be vertically lower than the inlet 204 and the EGR cooler second outlet.

The EGR cooler 202 may be positioned laterally in a vehicle system such that the slope of the EGR cooler 202 may slope downward along a transverse axis of the vehicle (e.g., the vehicle may have a longitudinal axis and the transverse axis may be perpendicular to the longitudinal axis), with the first outlet 206 geodetically lower than the inlet 204 and geodetically lower than the second outlet 208. The lateral positioning of the EGR cooler in the vehicle system may be such that when the vehicle is navigating a downslope or an upslope, the EGR cooler slope may not be altered significantly. In other examples, the EGR cooler may slope downward along the longitudinal axis of the vehicle.

The flow of fluids through the inclined EGR cooler 202 may be along a first flow path 212, from EGR cooler inlet 204 along a downward slope towards the EGR cooler first outlet 206, connecting to the engine exhaust system, and along a second flow path 214 from EGR inlet 204 to the EGR cooler second outlet, connecting to the engine intake, as indicated by dashed lines with arrows. The first flow path 212 may be more inclined relative to the second flow path 214. In some examples, the second flow path may not be in a vertically downward slope or may be along a vertically upward slope, depending on the relative positioning of the inlet 204 and the EGR cooler second outlet 208 on the EGR cooler.

Condensate generated in the inclined EGR cooler may flow towards the EGR cooler first outlet 206 along the first flow path 212 towards gravity, away from the EGR cooler second outlet 208 connecting to the engine intake. An EGR cooler first outlet valve 210 may regulate the flow through the EGR cooler first outlet 206. In one example, the valve may be opened to admit a controlled amount of fluid to the exhaust manifold. In an example, the EGR cooler first outlet valve may be configured as an on/off valve, or it may be a continuously adjustable valve. The EGR cooler first outlet valve 210 may be adjusted (e.g., opened and closed) by an actuator (e.g., a pneumatic, hydraulic, or electric actuator) responsive to a signal received from a controller. The exhaust flow to the intake manifold from the EGR cooler second outlet may be regulated based on target EGR flow rate, for example, and flow of exhaust gas to the exhaust manifold may be based on engine temperature. An EGR valve, for example valve 52 shown in FIG. 1, downstream of the EGR cooler second outlet 208 may regulate EGR flow to the engine. In another example, the EGR valve regulating the EGR flow rate may be upstream of the EGR cooler. In a still further example, the EGR cooler first outlet valve 210 may be dispensed with, and all flow control through the EGR cooler may be provided by the EGR valve. In examples where the EGR valve is positioned downstream of the EGR cooler in the EGR flow direction (e.g., a cold-side EGR valve), exhaust gas may flow through the EGR cooler during virtually all engine operating conditions, and the EGR valve may control how much of the exhaust gas in the EGR cooler flows to the intake. As such, when the EGR valve is fully closed, nearly all the exhaust gas traveling through the EGR cooler is directed back to the exhaust, while when the EGR valve is open, at least some of the exhaust gas traveling through the EGR cooler is directed to the intake.

Thus, condensate generated in the EGR cooler may be drained along the first flow path through the EGR first outlet, which is geodetically lower than the inlet 204 and the EGR cooler second outlet 208. By doing so, the condensate that may otherwise flow towards the engine is directed away from the engine, preventing engine combustion problems.

Referring now to FIG. 3, a schematic 300 of a CAC 302 with an inlet 304 and an outlet 306 is illustrated. The charge air cooler may be the CAC 18 shown in FIG. 1, the CAC inlet 304 connecting downstream of an compressor and directing the compressed air through the CAC. The inlet 304 may admit the charge air from the compressor into the CAC. The CAC may flow the charged air through a plurality of heat exchange passages to remove heat from the charge air and the cooled charged air may exit the CAC through the outlet 306 towards the intake manifold of an engine.

During the course of the cooling the compressed air flowing through the CAC, condensation may form on any internal surface of the charge air cooler that is cooler than the dew point of the compressed air. The condensate may accumulate over time in the CAC and may be introduced from the CAC into the intake manifold and to the engine unpredictably and in large quantities in an abrupt manner, for example in the event of an accelerator pedal tip-in. The large volume of condensate introduced into the engine may result in disruption of normal engine functioning and may damage components downstream of the cooler.

To mitigate the problem of condensate accumulation in the CAC, the inlet 304 of the CAC may be geodetically higher than the outlet 306, such that the CAC 302 may be inclined at an angle β relative to a horizontal axis 301, as illustrated in FIG. 3. The angle β relative to the horizontal axis 301 may range from 0°-25° in one example, although other angles are within the scope of this disclosure. The downslope of the CAC 302 from the inlet 304 to the outlet 306 may direct flow exiting the outlet 306 along gravity, towards the intake manifold and the engine, as indicated by the dashed lines with arrowheads. This incline of the CAC may also direct condensate generated in the CAC 302 to continuously flow towards the engine in small quantities, preventing condensate accumulation in the CAC 302 and preventing large volume of condensate from entering the engine, which may disrupt engine function and damage components downstream of the CAC.

Accumulation of large volume of condensate in heat exchangers associated with an engine may result in flow of the accumulated condensate to the engine, which may result in engine combustion problems, including engine misfire. FIG. 4 is a flow chart illustrating a method 400 for controlling condensate flow through an inclined EGR cooler connected to an intake system and to an exhaust system of an engine. The method 400 may control flow through the inclined EGR cooler, for example the EGR cooler of FIGS. 1 and 2, wherein a first outlet of the EGR cooler connecting to the exhaust system is vertically lower than an EGR cooler inlet and an EGR cooler second outlet connecting to the engine intake. The inclined EGR cooler may drain the condensate generated in the EGR cooler through the first outlet along gravity, towards the exhaust system, preventing the condensate from entering the engine intake through the EGR cooler second outlet. The EGR flow through the EGR cooler first outlet may be regulated by an EGR cooler first outlet valve, for example the valve 210 illustrated in FIG. 2. The EGR flow rate to the engine intake may be regulated by an EGR valve connecting the EGR cooler second outlet to the engine intake, for example, the valve 52 shown in FIG. 1.

The method 400 also includes flowing compressed air through an inclined CAC, for example the CAC described above in reference to FIGS. 1 and 3, wherein the CAC outlet is lower than the CAC inlet, draining the small volume of condensate from the CAC towards the engine, thereby preventing accumulation of large quantities of condensate the CAC, which if swept to the engine may result in combustion problems.

Instructions for carrying out method 400 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 400 starts at 402 by determining engine operating parameters. Engine operating parameters may include engine speed, engine load, temperature, etc. The method 400 proceeds to 403, where during engine operation, compressed air flows from a compressor into the inclined CAC though the CAC inlet, for example the compressor 114 connecting the CAC 18, as illustrated in FIG. 1. The compressed air is cooled as it flows through the CAC and exits through the CAC outlet, which is vertically lower than the CAC inlet. The cooled compressed air exiting the inclined CAC may flow through the intake manifold towards the engine, as discussed above with reference to FIG. 1. The condensate generated in the CAC may also be directed to flow through the inclined CAC along gravity towards the engine, preventing accumulation of large quantities of condensate in the CAC.

At 404, the method 400 assesses if engine cold start conditions are present. The cold start conditions may be assessed by sensing parameters such as ambient air temperature, engine oil temperature, engine temperature, time elapsed between two engine start events etc. In one example, cold start condition may be determined by comparing engine temperature to a threshold temperature (e.g., cold start may be indicated when engine coolant temperature is equal to ambient temperature). If cold start conditions are detected, the method 400 proceeds to 406, where the EGR cooler first outlet valve is opened, enabling a first flow path flowing in a downward slope from the EGR cooler inlet to the EGR cooler first outlet connecting to the exhaust system, wherein the EGR cooler inlet is vertically higher than the EGR cooler first outlet. Condensate may generate in the EGR cooler during cold start conditions, when the temperature of the engine coolant is much lower than the exhaust gas. The low coolant temperature may lead to a large reduction in exhaust gas temperature (below dew point) flowing through the EGR cooler, generating condensate. Any condensate generated in the EGR cooler may flow along the first flow path along a downward slope of the EGR cooler through the open EGR cooler first outlet valve, to the exhaust system downstream of the engine. Additionally, during the cold start conditions or other conditions where engine temperature is lower than desired, the EGR cooler first outlet valve may be opened to transfer heat from the exhaust gas to the engine coolant flowing through the EGR cooler, thus expediting warming of the engine.

At 408, the EGR flow rate through the second outlet to the intake system of the engine may be controlled through the EGR valve. The EGR flow rate may be based on operating parameters and the desired EGR rate may be set in a suitable manner, such as based on a table located in the memory of the controller, and may be determined based on engine speed and load. In one example, EGR rate may be adjusted based on feedback from sensors located downstream of the EGR valve.

The method at 410 may assess if the condensate accumulated in the EGR cooler is more than a threshold. The estimation of condensate accumulation in the EGR cooler may be based on various parameters in the EGR cooler, such as mass airflow through the EGR cooler, temperature at the outlet of the EGR cooler, exhaust gas humidity, and/or pressure of the EGR cooler. If the condensate accumulated in the EGR cooler is above the threshold, the method 400 proceeds to 412, where engine operating parameters may be selectively adjusted. The adjustments may include flowing the exhaust through a wastegate, bypassing a turbine (for example, wastegate 90 bypassing turbine 116, as illustrated in FIG. 1), to prevent condensate from entering and damaging the turbine. In another example, the EGR flow may be shut off to prevent condensate from entering the turbine. The selective adjustments may be based on turbine speed in one example, e.g., the wastegate may be adjusted only when turbine speed is above a threshold and/or only when opening the wastegate will not undesirably lower boost pressure. Further, in some examples, when the amount of condensate forming in the EGR cooler is relatively high and it is not possible to bypass the turbine, the flow of exhaust through the EGR cooler may shut off. Method 400 then returns. If it is determined at 410 that condensate in EGR cooler is below the threshold, the method returns.

Returning to 404, if engine cold start conditions are not present, the method proceeds to 414, where the EGR cooler first outlet valve is closed, resulting in flow of exhaust gas through the second flow path through the EGR cooler second outlet connecting to the engine intake. The second flow path may be along a less vertically downward slope relative to the first flow path. In other examples, the second flow path may not have a vertically downward slope or may be along a vertically upward slope.

At 416, the EGR flow rate through the second outlet to the intake system of the engine may be controlled through the EGR valve. The EGR flow rate may be based on operating parameters and the desired EGR rate may be set in a suitable manner, such as based on a table located in the memory of the controller, and may be determined based on engine speed and load.

Even when the engine is not operating under cold start conditions, condensate may form in the EGR cooler. Thus, when the EGR first outlet valve is closed, condensate may begin to accumulate in the EGR cooler. In some examples, enough condensate may form that it could be swept to the engine, even with the inclined EGR cooler described herein. Thus, in some examples the amount of condensate accumulated in the EGR cooler may be estimated as described above, and if is above a threshold, a proactive clean-out cycle may be performed where the EGR first outlet valve is opened to direct the condensate to the exhaust. Accordingly, condensate accumulated in EGR cooler may be assessed at 418, and if condensate is above a threshold, the EGR valve may be opened at 420 to direct flow of the accumulated condensate through the first flow path towards the exhaust system.

The method 400 may proceed to 412, where selective adjustment of engine operating conditions takes place, for example preventing condensate from entering the turbine by engaging the wastegate or by shutting off the EGR flow, as described above. In some examples, the selective adjustment of the engine operating parameters at 412 may be performed only when the condensate in the EGR cooler is relatively high, such as higher than the amount of condensate that triggers the clean-out cycle described above.

In this way, by regulating the flow of condensate by an inclined arrangement of the heat exchangers of an engine (an inclined EGR cooler and an inclined CAC), the condensate generated in the heat exchanger may drain along a downward slope towards gravity, preventing large volume of condensate from accumulating in the heat exchangers. The charge air cooler may be inclined along an intake airflow direction, such that condensate is directed to the engine. In contrast, the EGR cooler may inclined along an exhaust gas flow direct, such that condensate is directed to the exhaust system and away from the engine.

The technical effect of inclined heat exchangers is reduced condensate accumulation in the heat exchangers, preventing large volume of condensate from being swept from the heat exchangers to the engine, thereby reducing engine combustion problems, including engine misfire.

One example system for condensate management comprising an engine coupled to an intake system and an exhaust system, an exhaust gas recirculation (EGR) system coupling the exhaust system to the intake system, and an EGR cooler positioned in the EGR system, the EGR cooler having an inlet coupled to the exhaust system, a first outlet coupled to the exhaust system, and a second outlet coupled to the intake system, the second outlet positioned vertically higher than the first outlet. In a first example of the system, the EGR cooler is positioned in the EGR system at an angle such that the inlet is vertically higher than the first outlet. A second example of the system optionally includes the first example and further includes wherein the inlet and first outlet define a first flow path through the EGR cooler, wherein exhaust gas traveling through the EGR cooler along the first flow path travels with a vertically downward slope from the inlet to the first outlet. A third example of the system optionally includes one or more of the first and second examples, and further includes wherein the system is installed in a vehicle having a longitudinal axis and a transverse axis parallel to the longitudinal axis, and wherein the vertically downward slope of the first flow path is a vertically downward slope along the transverse axis. A fourth example of the system optionally includes one or more of the first through third examples, and further includes wherein the inlet and the second outlet define a second flow path through the EGR cooler, wherein exhaust gas traveling through the EGR cooler along the second flow path travels with a smaller vertically downward slope than the vertically downward slope of the first flow path. A fifth example of the system optionally includes one or more of the first through fourth examples, and further includes wherein exhaust gas traveling through the EGR cooler along the second flow path travels with no slope or with a vertically upward slope. A sixth example of the system optionally includes one or more of the first through fifth examples, and further includes a charge air cooler positioned in the intake system, the charge air cooler having an inlet to receive compressed intake air from downstream of a compressor and an outlet to expel the compressed intake air to the engine, the charge air cooler positioned at an angle with the inlet vertically higher than the outlet. A seventh example of the system optionally includes one or more of the first through sixth examples, and further includes a controller configured to direct exhaust gas from the inlet to the second outlet based on a target EGR flow rate and to direct exhaust gas from the inlet to the first outlet based on engine temperature. An eighth example of the system optionally includes one or more of the first through seventh examples, and further includes a first valve positioned to control flow through the first outlet and a second valve positioned to control flow through the second outlet, wherein the controller is configured to adjust a position of the first valve to direct exhaust gas from the inlet to the first outlet based on engine temperature and to adjust a position of the second valve to direct exhaust gas from the inlet to the second outlet based on a target EGR flow rate.

An example method comprising during a first condition, flowing exhaust gas through a first flow path of an exhaust gas recirculation (EGR) cooler, the first flow path defined by an inlet of the EGR cooler and a first outlet of the EGR cooler and having a vertically downward slope and during a second condition, flowing exhaust gas through a second flow path of the EGR cooler, the second flow path defined by the inlet of the EGR cooler and second outlet of the EGR cooler. In a first example of the method, flowing exhaust gas through the first flow path comprises flowing exhaust gas from the EGR cooler to an exhaust system fluidically coupled to an engine, and wherein flowing exhaust gas through the second flow path comprises flowing exhaust gas from the EGR cooler to an intake system fluidically coupled to the engine. A second example of the method optionally includes the first example and further includes wherein the first condition comprises engine operation with engine temperature below a threshold, and wherein the second condition comprises engine operation with EGR enabled. A third example of the method optionally includes the first and second examples and further includes during the second condition and responsive to an estimated amount of condensate in the EGR cooler exceeding a threshold, flowing exhaust gas through the first flow path. A fourth example of the method optionally includes one or more of the first through third examples, and further includes, during the first condition, adjusting one or more engine operating parameters based on an estimated amount of condensate in the EGR cooler. A fifth example of the method optionally includes one or more of the first through fourth examples, and further includes flowing intake air through a charge air cooler and to an engine, where the intake air flows through the charge air cooler along a vertically-downward slope.

Another example system for condensate management includes an engine coupled to an intake system and to an exhaust system, the intake system including a charge air cooler positioned to direct condensate toward the engine and an exhaust gas recirculation (EGR) system coupling the exhaust system to the intake system and including an EGR cooler positioned to direct condensate away from the engine. In a first example of the system, the EGR cooler comprises an inlet coupled to the exhaust system, a first outlet coupled to the exhaust system, and a second outlet coupled to the intake system, the second outlet positioned vertically higher than the first outlet. A second example of the system optionally includes the first example and further includes wherein the charge air cooler comprises an inlet to receive compressed intake air from downstream of a compressor and an outlet to expel the compressed intake air to the engine, the charge air cooler positioned at an angle with the inlet vertically higher than the outlet. A third example of the system optionally includes one or both of the first example and second example and further includes wherein the EGR cooler is positioned in the EGR system at an incline to produce a downward slope in an EGR flow direction from the inlet to the first outlet.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an engine coupled to an intake system and an exhaust system;
an exhaust gas recirculation (EGR) system coupling the exhaust system to the intake system, exhaust gas flow through the EGR system to the intake system controlled by an EGR valve;
an EGR cooler positioned in the EGR system, the EGR cooler having an inlet coupled to the exhaust system, a first outlet coupled to the exhaust system, and a second outlet coupled to the intake system, the second outlet positioned vertically higher than the first outlet; and
an EGR cooler first outlet valve fluidically coupling the first outlet to the exhaust system, exhaust gas flow through the EGR cooler to the exhaust system controlled by the EGR cooler first outlet valve.

2. The system of claim 1, wherein the EGR cooler is positioned in the EGR system at an angle such that the inlet is vertically higher than the first outlet.

3. The system of claim 1, wherein the inlet and the first outlet define a first flow path through the EGR cooler, wherein exhaust gas traveling through the EGR cooler along the first flow path travels with a vertically downward slope from the inlet to the first outlet, and wherein the EGR cooler has a top surface that is angled with the vertically downward slope.

4. The system of claim 3, wherein the system is installed in a vehicle having a longitudinal axis and a transverse axis perpendicular to the longitudinal axis, and wherein the vertically downward slope of the first flow path is a vertically downward slope along the transverse axis.

5. The system of claim 3, wherein the inlet and the second outlet define a second flow path through the EGR cooler, wherein exhaust gas traveling through the EGR cooler along the second flow path travels with a smaller vertically downward slope than the vertically downward slope of the first flow path.

6. The system of claim 5, wherein exhaust gas traveling through the EGR cooler along the second flow path travels with no slope or with a vertically upward slope.

7. The system of claim 1, further comprising a charge air cooler positioned in the intake system, the charge air cooler having an inlet to receive compressed intake air from downstream of a compressor and an outlet to expel the compressed intake air to the engine, the charge air cooler positioned at an angle with the inlet vertically higher than the outlet.

8. The system of claim 1, further comprising a controller configured to direct exhaust gas from the inlet to the second outlet based on a target EGR flow rate and to direct exhaust gas from the inlet to the first outlet based on engine temperature.

9. The system of claim 8, wherein the controller is configured to adjust a position of the EGR cooler first outlet valve to direct exhaust gas from the inlet, to the first outlet, and to the exhaust system based on engine temperature and to adjust a position of the EGR valve to direct exhaust gas from the inlet to the second outlet based on a target EGR flow rate.

10. A method, comprising:
responsive to an engine cold start being determined, flowing exhaust gas through a first flow path of an exhaust gas recirculation (EGR) cooler from an inlet of the EGR cooler to a first outlet of the EGR cooler, the exhaust gas flowing from the first outlet to an exhaust system via a first EGR line and the first flow path having a vertically downward slope; and
responsive to a command to flow EGR, flowing exhaust gas through a second flow path of the EGR cooler from the inlet of the EGR cooler to a second outlet of the EGR cooler, the exhaust gas flowing from the second outlet to an intake system via a second EGR line.

11. The method of claim 10, wherein flowing exhaust gas to the exhaust system comprises opening an EGR cooler first outlet valve fluidically coupling the first outlet of the EGR cooler to the exhaust system, the exhaust system fluidically coupled to an engine, and wherein flowing exhaust gas to the intake system comprises opening an EGR valve fluidically coupling the second outlet of the EGR cooler to the intake system, the intake system fluidically coupled to the engine.

12. The method of claim 11, wherein the engine cold start being determined comprises an engine start with engine temperature below a threshold temperature being determined.

13. The method of claim 12, further comprising, when exhaust gas is flowing through the second flow path and responsive to an estimated amount of condensate in the EGR cooler exceeding a threshold, flowing exhaust gas through the first flow path and to the exhaust system.

14. The method of claim 10, further comprising, when exhaust gas is flowing through the first flow path, adjusting a position of a wastegate coupled across a turbine positioned in an exhaust passage downstream of a junction where the first outlet of the EGR cooler fluidically couples to the exhaust passage, the wastegate adjusted based on an estimated amount of condensate in the EGR cooler.

15. The method of claim 11, further comprising:
during engine operation where engine temperature is greater than a threshold temperature, maintaining the EGR cooler first outlet valve closed unless an estimated amount of condensate in the EGR cooler exceeds a threshold amount; and
flowing intake air through a charge air cooler and to the engine, where the intake air flows through the charge air cooler along a vertically-downward slope.

16. A system, comprising:
an engine coupled to an intake system and to an exhaust system, the intake system including a charge air cooler positioned to direct condensate toward the engine;
an exhaust gas recirculation (EGR) system coupling the exhaust system to the intake system and including an EGR cooler having a first outlet positioned to direct condensate away from the engine;
a first valve fluidically coupling the first outlet of the EGR cooler to the exhaust system via a first EGR line configured to flow exhaust gas to the exhaust system; and
a second valve fluidically coupling a second outlet of the EGR cooler to the intake system via a second EGR line configured to flow exhaust gas to the intake system.

17. The system of claim 16, wherein the EGR cooler comprises an inlet coupled to the exhaust system, and where the second outlet is positioned vertically higher than the first outlet.

18. The system of claim 17, wherein the EGR cooler is positioned in the EGR system at an incline to produce a downward slope in an EGR flow direction from the inlet to the first outlet, and wherein the inlet is positioned on a first side of the EGR cooler and the first outlet and the second outlet are positioned on a second, opposite side of the EGR cooler.

19. The system of claim 16, wherein the charge air cooler comprises an inlet to receive compressed intake air from downstream of a compressor and an outlet to expel the compressed intake air to the engine, the charge air cooler positioned at an angle with the inlet vertically higher than the outlet.

* * * * *